Aug. 23, 1966     S. M. BLANK     3,268,256
SAFETY SHOCK ABSORBER SYSTEMS
Filed Feb. 15, 1965     2 Sheets-Sheet 1

INVENTOR.
STEWART M. BLANK
BY *Michael M Schuster*
AGENT

Aug. 23, 1966          S. M. BLANK          3,268,256
SAFETY SHOCK ABSORBER SYSTEMS
Filed Feb. 15, 1965          2 Sheets-Sheet 2
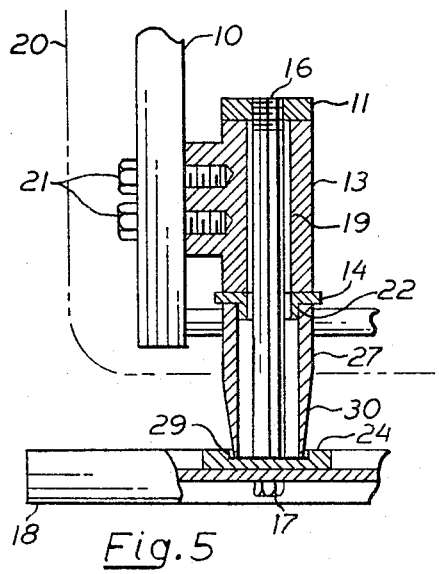
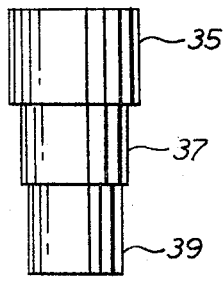
INVENTOR.
STEWART M. BLANK
BY Michael M. Schuster
AGENT

United States Patent Office 3,268,256
Patented August 23, 1966

3,268,256
SAFETY SHOCK ABSORBER SYSTEMS
Stewart M. Blank, 4634 Manhattan Beach Blvd.,
Lawndale, Calif.
Filed Feb. 15, 1965, Ser. No. 432,736
8 Claims. (Cl. 297—216)

This application is co-pending with applicant's prior application, Serial No. 328,880, filed December 9, 1963, now abandoned.

This invention relates to safety shock absorbing devices.

This invention provides a device which will absorb the energy of impact during a collision by yielding and deforming under a shock load.

An object of this invention is to provide a safety bumper which will yield under the shock of impact in a collision and so absorb energy.

A further object of this invention is to provide a safety bumper for vehicles which will have members that will deform permanently in order to absorb the energy of shock in a collision.

Still another object of this invention is to provide deformable members which will absorb the shock of a collision by permanent deformation but will still be capable of easy replacement for maintenance after the permanent deformation occurs in a collision.

A further object of the invention is to provide a safety bumper which can be applied to land, sea or air vehicles by adjusting deformation capability of the energy absorbing deformable members of the safety device, to provide for the predicted impact loads that might be encountered by the vehicle due to its projected size, weight and speed.

Still another object of the invention is to provide deformable members in a safety bumper which will fail progressively at varying strain rates, to provide a cushion impact under the first shock of collision and will gradually intensify resistance to the increased collision load as the energy of the collision impact increases to a peak before cessation of movement or the start of rebound.

Still a further object of this invention is to provide a shock absorber device that may be applied to seats in a vehicle to overcome the inertial effect of impact effect upon the seat by permanent deformation of a tubular member which will absorb the energy of impact during a collision or other accident to a vehicle.

A full understanding of the aforementioned objects of the invention and of further objects and advantages as well as those cited will be gained by reference to the following description and accompanying drawings in which:

FIG. 5 is another embodiment of the invention illustrated in FIG. 1;

FIG. 6 is another embodiment of the energy absorbing deformable member of the invention shown in FIG. 1;

FIG. 7 is an elevation of another embodiment of the invention;

FIG. 8 is an elevation of a fragment of the embodiment of the invention shown in FIG. 7 after an impact shock;

FIG. 9 is a sectional view taken on line 9—9 of the embodiment of the invention shown in FIG. 7.

Figure 1:
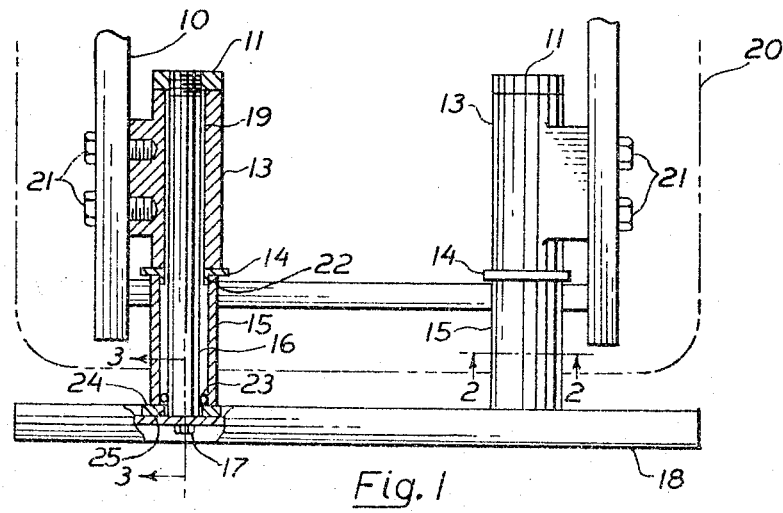
FIG. 1 is a top plan view of the safety bumper shown attached to a fragmentary view of a truck frame, with the body outline of the truck shown in phantom.
Figure 2:
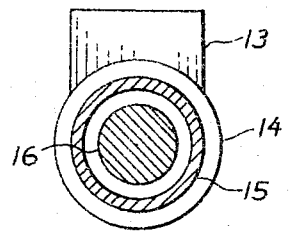
FIG. 2 is a fragmentary sectional view taken on line 2—2 of FIG. 1.
Figure 3:
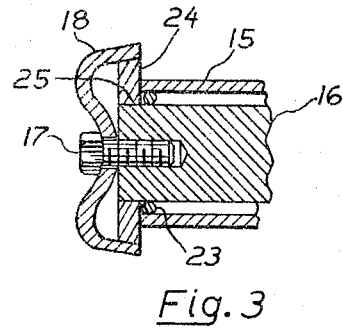
FIG. 3 is a fragmentary sectional view taken on line 3—3 of FIG. 1.

Although this invention is not limited to automotive vehicles, as it may be applied to fenders or bumpers on any vehicle subject to collision shock, such as fenders on a boat, FIG. 1 illustrates the invention as it would be utilized on a truck body.

In FIG. 1 the front end of a truck is shown in phantom. A segment of the truck frame 10 has the shaft mounting brackets 13 bolted to it with studs 21, the shaft mounting brackets 13 have a bore 19 through which the bumper mounting shafts 16 are slidably assembled and restrained from forward motion by threaded caps 11. Rings 14 are slidably mounted on the bumper mounting shafts 16 and have a reduced diameter 22 which locates the deformable members in the form of impact tubes 15 with equal radial spacing around bumper mounting shafts 16. The other end of the impact tubes 15 are radially spaced from the bumper mounting shafts 16 by the resilient rings 23. Reaction plates 24 abut the end of the impact tubes 15 and the inside surfaces of bumper 18. The bumper 18 is attached to the bumper mounting shafts 16 with bolts 17 running through the bumper into tapped holes in the bumper mounting shafts 16. The reaction plates 24 have clearance holes 25 to provide for slidable fit with the bumper shafts 16.

Figure 4:
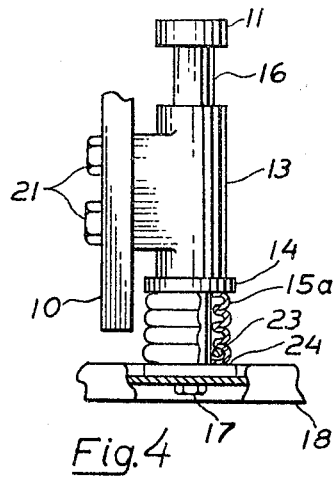
FIG. 4 is a fragmentary top plan view in partial cross-section of the safety bumper shown in FIG. 1 with parts shown in their translated position after impact load.

In a minor collision, which would not exceed the impact load capacity of the maximum yield strength of the impact tubes 15, the bumper 18 would act as a conventional automotive bumper to absorb the shock. Under heavier impact load, which would exceed the yield strength as a column of the impact tubes 15, the bumper 18 would push back on bumper mounting shafts 16, which are slidably mounted in the shaft brackets 13 and the impact tubes 15 would collapse in the manner shown in FIG. 4, failing as a column to the extent necessary to absorb the energy of the impact.

Since it is recognized that the sharpest impact load on the occupants of a vehicle would be at the beginning of the collision time in any rigid system, an improved embodiment of this invention is shown in FIG. 5. The reaction plate 24, as shown in this embodiment as a counter bore 29, which confines and locates the end of impact tube 27 concentric to the mounting shaft. The impact tube 27 in FIG. 5 is tapered at one end 30, so that deformation failure will begin at a lower load at the instant of impact and energy will be dissipated during the first minute intervals of time of the total collision time, and the dissipated energy will gradually build to meet the peak values of shock energy as the tapered area yields under the load and the load is gradually transferred into the heavier sections where further deformation occurs to absorb the remaining energy of the impact load. A further advantage of this embodiment provides protection at low speed collisions which can produce injuries or damage in a manner similar to high speed collision.

In tests to prove the effectiveness of the tapered impact sleeve 27, a specimen approximately 10 inches long was prepared having one end tapered from the outside diameter of 2 inches and a wall thickness of .125 to a wall thickness of .065 at the end for a distance of 2¾ inches. Specimen 1 was made of 6061–0 Aluminum Alloy and Specimen 2 was made of 6061–T4 Aluminum Alloy. The results of the tests were as follows for compression load to fail the member:

| Fold | Specimen 1, pounds | Specimen 2, pounds |
|---|---|---|
| 1 | 7,600 | 11,100 |
| 2 | 10,340 | 17,000 |
| 3 | 10,830 | 24,100 |
| 4 | 12,700 | 28,900 |
| 5 | 14,100 | 29,500 |
| 6 | 15,040 | 31,100 |
| 7 | 16,200 | 35,500 |
| 8 | 16,800 | 35,000 |
| 9 | 17,700 | |

It can be seen that a similar initial impact load will produce failure until the uniform section is reached and then the resistance increases sharply until it reaches a fairly uniform rate of increase and a final leveling off of resistance load.

The deformable member 35 shown in the embodiment of FIG. 6 would achieve an effect similar to the embodiment of FIG. 5 by the utilization of reduced diameters 37 and 39.

Another embodiment of this invention is shown in FIGS. 7, 8 and 9, where the shock absorbing device is applied to seats in a passenger vehicle. The seats 40 are mounted on rails 42 which constrain the seats from motion in all but a linear horizontal direction forward, backward motion being prevented by back stopping blocks 44. A pair of rod members 56 extend through the frames 54 of the seats 50 and are attached to a pair of forward stopping blocks 46 and a pair of back stopping blocks 44. A pair of deformation tubes 50 space the seats 40 apart and abut reaction blocks 58. Reaction blocks 58 abut seat frames 54. Deformation tubes 48 abut reaction blocks 58 on the front seat 40 and forward stopping blocks 46. Forward stopping blocks 46 are fixed to the frame of the vehicle thus anchoring the seats 40 through the pair of rods 56.

A set of heavy tubular spacers 52 reinforce the seat frames 54 between the reaction blocks 58 on the front seat and between the reaction blocks 58 and the rear stopping blocks 44 on the rear seat.

In normal use the seats are anchored by the relationship of the various parts of the shock absorber device and the fact that the retaining rods are fastened to the front stopping blocks which are in turn fastened to the vehicle frame, while the rails 42 prevent any other motion. In a collision, the shock energy of stopping the forward inertial motion of the mass of the car seats and passengers combined would be dissipated in permanent deformation of the deformation tubes 48 and 50. The pair of deformation tubes 48 may have different dimensions than the pair of deformation tubes 50 to provide for stopping the mass of all of the seats and passengers. All of the deformation tubes may have a variable cross-section as hereinbefore described to provide for a more gradual build-up of energy absorption.

This invention provides the advantage of rapid and inexpensive replacement of the impact tubes 15 after a collision or other incident has occurred, by the removal of bolts 17 and demounting of bumper 18. The reaction plates may then be slipped off of the bumper mounting shafts 16. The collapsed tubes 15 may then be removed and replacements installed by slipping the bumper mounting shafts 16 forward, then rebolting bumper 18 to bumper mounting shafts 16 with bolts 17. The tubes 15 may be made of any material suitable to absorb the anticipated load of impact for a particular vehicle and its cross-sectional area may be varied to establish the load capability.

It is to be understood that the described invention that has been shown as applied to the front bumper of a truck in the example would also be applied to the rear bumper to absorb rear end collisions. On boats and barges it might be applied to the fenders on the side, stern or bow. Airborne vehicles, such as helicopters, might have such bumpers applied to landing apparatus such as wheels or skids.

It is to be understood that the scope of this invention is not limited by the typical description of the applications given but may be varied to accomplish other objects, advantages and embodiments that come within the scope of the appended claims.

I claim:

1. In combination with a vehicle seat, installed in a vehicle, a shock absorber system which comprises: a seat frame, said seat frame adapted to retain a vehicle seat, said seat frame including a front member and a rear member, a multiplicity of rod members, said rod members having a first end and a second end, said rod members adapted to be installed through said seat frame through said front and rear members, said second ends of said rod members adapted to restrain said seat frame from rearward motion, said first ends of said rod members adapted to be fixed to the frame of a vehicle; a pair of rails, said rails adapted to be mounted in a vehicle, said rails adapted to limit said seat frame to linear motion toward the front and rear of a vehicle; a multiplicity of deformation tubes, said deformation tubes installed over said rod members in a concentric relationship, said deformation tubes adapted to be installed between said front member of said seat frame and a vehicle frame and said tubular members adapted to fail in compression to absorb shock energy due to forward inertial motion of a vehicle seat during a collision.

2. Apparatus as described in claim 1 which includes tubular reinforcing members adapted to be installed concentrically over said rod members between said front member and said rear member of said seat frame.

3. Apparatus as described in claim 1 which includes said deformation tubes having a first end and a second end, said first end having the external shape of a frustrum of a cone for a portion of the total length of said deformation tube, said conical shape being co-axial with said deformation tube.

4. Apparatus as described in claim 1 which includes said deformation tubes having a first end and a second end, said deformation tubes having an external configuration which includes a plurality of concentric cylindrical surfaces diminishing in diameter from said second end to said first end.

5. In combination with a multiplicity of vehicle seats, installed in a row in a vehicle, a shock absorber system which comprises: a multiplicity of seat frames having front members and rear members, a multiplicity of rod members, said members having first ends and second ends, said rod members adapted to be installed through said seat frames through said front and rear members, said second ends of said rod members adapted to restrain said seat frames from rearward motion, said first ends of said rod members adapted to be fixed to the frame of a vehicle; a pair of rails, said rails adapted to be mounted in a vehicle, said rails adapted to limit said seat frames to linear motion toward the front and rear of a vehicle; a multiplicity of deformation tubes, said deformation tubes installed over said rod members in a concentric relationship, each of said deformation tubes adapted to be installed between said front member of a seat frame and said rear member of a preceding seat in a row of vehicle seats, and a multiplicity of said deformation tubes equal in number to said rod members adapted to be installed between said front member of a first vehicle seat in a row of seats and the vehicle frame, said tubular members adapted to fail in compression to absorb shock energy due to forward inertial motion of said vehicle seats during a collision.

6. Apparatus as described in claim 5 which includes tubular reinforcing members adapted to be installed concentrically over said rod members between said front members and said rear members of said seat frames.

7. Apparatus as described in claim 5 which includes said deformation tubes having a first end and a second end, said first end having the external shape of a frustrum of a cone for a portion of the total length of said deformation tube, said conical shape being co-axial with said deformation tube.

8. Apparatus as described in claim 5 which includes said deformation tubes having a first end and a second end, said deformation tubes having an external configuration which includes a plurality of concentric cylindrical surfaces diminishing in diameter from said second end to said first end.

(References on following page)

References Cited by the Examiner

UNITED STATES PATENTS

| | | | |
|---|---|---|---|
| 2,251,347 | 8/1941 | Williams et al. | 213—221 |
| 2,335,340 | 11/1943 | Koppelman | 297—216 X |
| 2,682,931 | 7/1954 | Young | 188—1 |
| 2,870,871 | 1/1959 | Stevinson | 188—1 |
| 2,933,127 | 4/1960 | Brewster | 297—216 |
| 2,959,207 | 11/1960 | Brewster | 297—216 |
| 2,971,566 | 2/1961 | Negroni | 297—302 |
| 3,001,815 | 9/1961 | Weber | 293—1 X |
| 3,059,966 | 10/1962 | Spielman | 297—216 |
| 3,081,119 | 3/1963 | Dison | 293—48 |
| 3,112,955 | 12/1963 | Stolz | 297—216 |
| 3,146,014 | 8/1964 | Kroell | 293—70 |

ARTHUR L. LA POINT, *Primary Examiner.*

H. BELTRAN, *Assistant Examiner.*